United States Patent [19]

Tanabe

[11] Patent Number: 4,472,051
[45] Date of Patent: Sep. 18, 1984

[54] APPARATUS FOR EXTENDING AND SETTING ROLLED SENSITIVE FILMS

[75] Inventor: Kenjiro Tanabe, Hikone, Japan

[73] Assignee: Dainippon Screen Mfg. Co., Ltd., Kyoto, Japan

[21] Appl. No.: 407,341

[22] Filed: Aug. 12, 1982

[30] Foreign Application Priority Data

Sep. 12, 1981 [JP] Japan .......................... 56-137008[U]

[51] Int. Cl.³ ............................................. G03B 27/60
[52] U.S. Cl. ........................................ 355/73; 355/76; 354/203; 83/451; 242/55
[58] Field of Search ............................ 83/451; 242/55; 354/203; 355/73, 76

[56] References Cited

U.S. PATENT DOCUMENTS 3,597,078  8/1971  Miyauchi ............................. 355/73
3,790,154  2/1974  Gerber ............................ 83/451 X
4,029,404  6/1977  Mizukami ........................ 355/76 X
4,197,005  4/1980  Sippel ................................. 355/73

FOREIGN PATENT DOCUMENTS 1234122  2/1967  Fed. Rep. of Germany ........ 355/73
54-149621 11/1979  Japan .

Primary Examiner—Donald R. Schran
Assistant Examiner—Taylor J. Ross
Attorney, Agent, or Firm—Brumbaugh, Graves, Donohue & Raymond

[57] ABSTRACT

A propsed apparatus comprising a film reel, a film feeder, a vacuum film holder and a mechanism adapted to move the feeder along the plate is adapted for use in the projection-back in process camera device. These members are arranged such that a film which is being unwound away from the reel is gradually sucked onto said film holder with the movement of said feeder guided by the mechanism. The apparatus may include a film cutter for cutting the film after each stroke of said feeder together with a sheet reel having a wound sheet and adapted to supply it for closing up sucking apertures of said holder portion not covered with the film.

1 Claim, 2 Drawing Figures

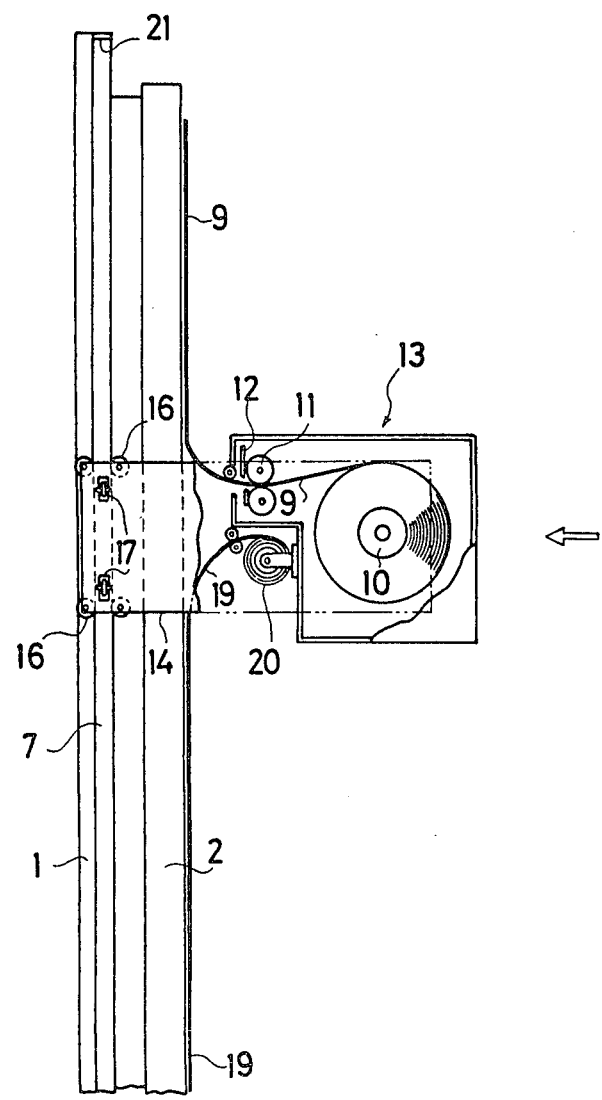

APPARATUS FOR EXTENDING AND SETTING ROLLED SENSITIVE FILMS

BACKGROUND OF THE INVENTION

The invention relates to an apparatus for extending and setting rolled photosensitive materials, and more particularly to an apparatus for extending and setting large-sized rolled film, printing paper or the likes (hereinafter inclusively called "film") which are to be set on a large-sized projection photographing device for a process camera system.

The process camera system may have, in addition to the standard photographing device, a large-sized film holder for use in preparation of negatives for printing outdoor advertisements.

In manually setting a large-sized film on the vacuum film holder provided in the large-sized photographing device or a so-called projection-back device, at least two operators have had to carefully work in order to avoid any discrepancy, slackening, wrinkle or fold in the film. The Japanese Patent Laying-open Gazette No. Sho. 54-149621 in name of the Applicant of this application has disclosed an example of apparatuses for mechanically loading the film. In the proposed apparatus in said Gazette, film magazines for the large-sized rolled films are disposed above and below a vacuum film holder, each of them having a film take up roller or a film feeding roller both driven by a motor so that the rolled film discharged from one of the magazines that is provided with a cutter may advance via the vacuum holder toward the other magazine so as to be received therein while the photographed portion of said film being cut prior to said receipt. Since such usage of projection-back is not so frequent, the above known apparatus may be inconvenient from a practical viewpoint and so expensive because of considerable wide space occupied by it in a darkroom.

BRIEF SUMMARY OF THE INVENTION

It is an object of the invention is to provide an apparatus for extending and setting rolled films, the apparatus comprising a film feeder, a vacuum film holder and a mechanism adapted to move the film feeder in a direction parallel with the film holder so that the film can be loaded by one personnel alone with easiness without a necessity of wide space occupied by the apparatus.

It is a further object of the invention to provide such an apparatus that comprises, in its film feeder, a film reel for rolling up a film and a feeder roller or feeder rollers for supplying the film therethrough.

It is a still further object of the invention to provide an apparatus comprising, in its film feeder or elsewhere, a film cutter for cutting a film supplied from said feeder to advance along and extend over the vacuum film holder while being sucked thereto.

Other objects and merits will be made apparent in the course of following description with reference to the drawings showing an embodiment.

BRIEF DESCRIPTION OF THE DRAWINGS

FIG. 2 is a plan view of the primary portion of said embodiment.

DETAILED DESCRIPTION OF THE INVENTION

Figure 1:
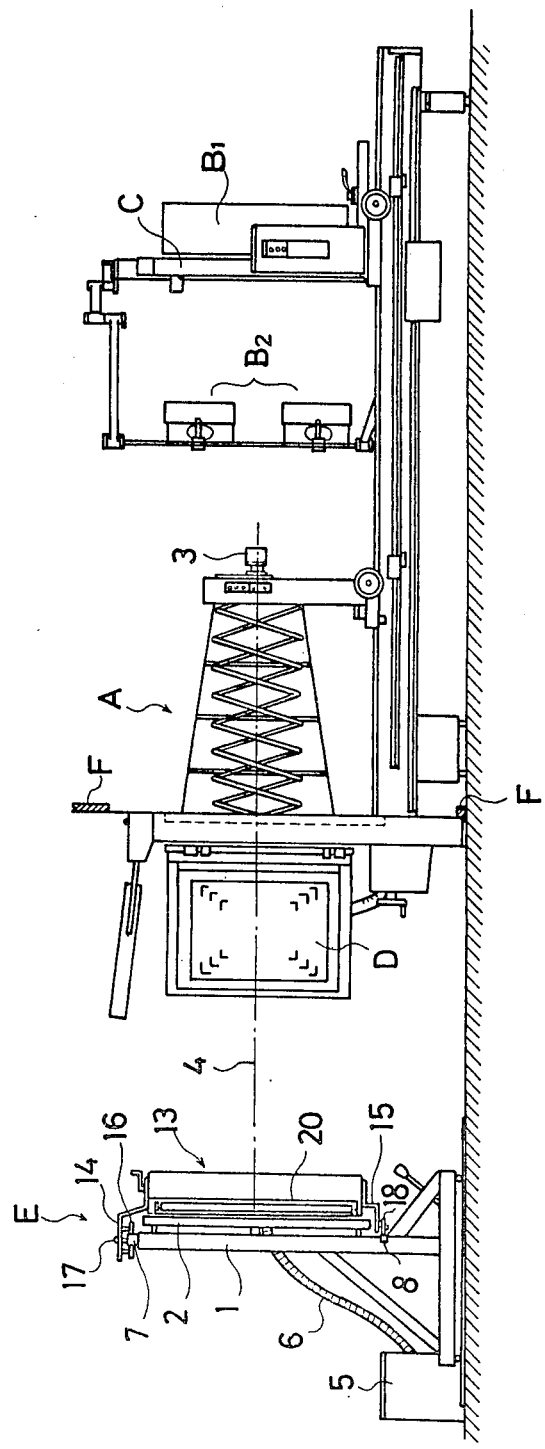
FIG. 1 is a side elevational of an entire assembly of process camera apparatus additionally equipped with a projection-back having an embodied apparatus of the invention.

In the illustrated assembly, there are laid out a process camera (A), a lighting source ($B_1$) for transparently photographing, a lighting source ($B_2$) for reflectional photography, a holder (C) for original pictures, a usual plate (D) for sucking and holding thereon usual films, a large-sized photographing device (E) (projection-back) for projection photography, and a partition (F) of a darkroom. The members (A) to (C) are located in a "lightroom".

A vacuum film holder 2 for large-sized films is secured to a stand frame 1 in the projection-back (E) in such a state that the optical axis 4 of a lens 3 passes through the center of said holder 2 whose surface is meeting at right angles with the axis. The vacuum film holder 2 is communicated with a vacuum pump 5 by means of a duct 6. A large number of small apertures are opening on the surface of said holder 2 with a uniform distribution over a certain range thereof to thereby impart to it a sucking ability.

Guide rails 7, 8 are respectively fixed to the uppermost end and the lower portion of the stand frame 1 in a horizontal direction parallel to the film holder 2. A film feeder 13 comprises a film reel 10 having a film 9 rolled up thereon, a pair of feeder rollers 11 and a film cutter 12, all of these being built-in parts. The feeder 13 is also provided with supporting brackets 14, 15 one of which is secured to the upper end of said feeder while the other being secured to the lower end. The upper bracket 14 has paired guide rollers 16 as well as an unpaired guide rollers 17 so that the former may roll along the upper rail 7 placed therebetween while the latter rolling on the upper surface of said rail 7. The lower bracket 15 has one or more guides 18 which run on the side surface of the lower rail 8. Thus, the film feeder 13 securely engages with the vacuum film holder 2 in such a manner as to be movable along said plate in a horizontal direction and in parallel therewith.

Provided on a said feeder's 13 surface facing the film holder 2 is a sheet reel 20 adapted to wind up a sheet 19 for closing up the abovesaid small sucking apertures distributed over the surface of said film holder 2. The supporting shaft for said reel 20 is disposed parallel with that of film reel 10.

The sheet reel 20 is a hollow cylinder having bearing portions on its upper and lower ends, each of stubs supported by arms and constituting the supporting shaft for the reel 20 thereby being journaled by said bearing portions so as to render said reel rotatable. There is provided a coil spring within said cylinder and one end of this spring is secured to said supporting shaft while the other end being fixed on the inner surface of said cylinder. The coil spring thus gives to the reel 20 a torque urging the sheet 19 toward a winding direction. The free end of said sheet 19 is, in FIG. 2, engaging with the left-hand end of the film holder 2, seen from the arrowed direction.

In operation, the film feeder is at first caused to move along the film holder 2 rightwards seen from the arrowed direction in FIG. 2. During this motion of the feeder 13, the sheet 19 is pulled out from the sheet reel 20 against the abovesaid winding torque and at the same time the vacuum pump 5 is kept running for sucking air through the abovesaid sucking apertures of the plate 2. The feeder 13 will continue to move rightwards until its supporting bracket 14 abuts against a stopper 21 disposed at the right end of the film holder 2. The feeder is then caused to move in the reverse direction, i.e. leftwards, with a reduced speed also along the vacuum film holder 2.

At the beginning of this reverse motion, the rolled film 9 is pulled out by the feeder rollers 11 from the film reel 10, and then the free end of said film 9 is fixed on the right-hand end portion of the vacuum film holder 2 by means of the sucking action thereof wherein the predetermined position of said film's free end is indicated and adjusted on a scale provided adjacent the right-hand end of said holder 2.

Subsequently, the film feeder 13 will be caused again to move leftwards also along the film holder 2. The speed of thus reopened reverse motion of said feeder is controlled to coincide with the feeding speed of the feeder rollers 11. The sheet 19 will be, according to this movement of the feeder 13, retracted from the film holder 2 and wound on the sheet reel 20.

It will be appreciated now that the vacuum film holder 2, when in operation, is covered almost wholly with the film 9 and/or the sheet 19 so that most of the small apertures on said holder are thereby closed. Consequently, the unwound film 9 is gradually extended over the suction plate 2 and forcibly sucked thereto while being pulled out of the reel 10 wherein the strong suction effected by the sucking apertures overcomes the resilient force of said film, which force tends to bend the film itself, to thereby ensure a secure fixation thereof onto the surface of said holder 2. The discrepancy or misplacing, slackening, wrinkle or fold which are inevitable in the known methods are shut out in this manner. The film 9 will then be cut with the cutter 12 when a desired length of said film (it may be detected on a counter integratingly counting the revolution number of the feeding rollers 11) has been supplied. At last, the cut end is fixed to the vacuum film holder 2.

Summarizing the invention, the proposed apparatus for extending and setting rolled sensitive films is suited for use in the projection-back of process camera apparatus in setting thereon large-sized films because the film feeder moves along the vacuum film holder in said projection-back so that any desired length of film might be easily pulled out of the film reel and be set on said plate by one operator without producing any slackening, wrinkle or fold in said film. If there is added to the film feeder a sheet reel having a wound sheet adapted to close sucking apertures of the film holder, the sucking efficiency is improved by locally or selectively intensifying the sucking power of a restricted portion of said apertures distributed over said plate so that the vacuum pump is designed to have the lowest necessary capacity. Further, since said film is gradually sucked onto said film suction plate by moving the film feeder, it is possible to securely extend and set the film on said plate by effectively overcoming the film's resilient force thereby avoiding any discrepancy of film from the exact position. Still further, the proposed apparatus does not require a so wide space for equipment thereof. All the above merits will make the apparatus more suitable for practical use in the above-said projection-back device.

The invented apparatus can be attached also to the usual vacuum film holder (D), and a knife may be used as a substitute for the cutter.

What is claimed is:

1. Apparatus for positioning sensitive sheet material comprising a feeder mechanism, a sensitive sheet reel mounted on said feeder mechanism adapted to hold sensitive sheet material wound thereon, said feeder mechanism having feed rollers associated therewith for discharging the sensitive sheet material by unwinding it from the sensitive sheet reel, a vacuum holder for supporting said feeder mechanism and for sucking sheet material unwound from the sensitive sheet reel into fixed position thereon, means for moving the feeder mechanism along said holder in conjunction with the discharge of sensitive sheet material by the feed rollers whereby sensitive sheet material is removed from the sensitive sheet reel so as to be gradually drawn against and fixed in position on the holder by suction, a second reel mounted on said feeder mechanism and movable with the sensitive sheet reel and mounted so that its axis of rotation is parallel to that of the sensitive sheet reel, the second reel supporting an impermable sheet which is adpated to be wound thereon and to uncover apertures in the vacuum holder during the motion of the feeder mechanism along said holder so as to assure application of sufficient vacuum to the sensitive sheet material discharged onto the holder by the feed rollers.

* * * * *